United States Patent [19]
Ito

[11] Patent Number: 5,852,431
[45] Date of Patent: Dec. 22, 1998

[54] VIDEO MONITOR ADJUSTMENT SYSTEM

[75] Inventor: Hiroshi Ito, Matto, Japan

[73] Assignee: Nanao Corporation, Matto, Japan

[21] Appl. No.: 848,190

[22] Filed: Apr. 29, 1997

[30] Foreign Application Priority Data

Apr. 30, 1996 [JP] Japan ................................. 8-108866

[51] Int. Cl.⁶ ................................................ G09G 5/08
[52] U.S. Cl. ........................... 345/145; 345/157; 345/127
[58] Field of Search .................................. 345/145, 146, 345/157, 156, 162, 163, 160, 161, 167, 168, 173, 127, 128, 129, 130, 131

[56] References Cited

U.S. PATENT DOCUMENTS

| | | | |
|---|---|---|---|
| 4,354,184 | 10/1982 | Woborschil | 345/145 |
| 4,661,810 | 4/1987 | Himelstein et al. | 345/145 |
| 4,698,625 | 10/1987 | McCaskill et al. | 345/145 |
| 5,030,945 | 7/1991 | Yeomans | 345/145 |
| 5,302,967 | 4/1994 | Yonezawa et al. | 345/145 |
| 5,565,888 | 10/1996 | Selker | 345/145 |
| 5,739,821 | 4/1998 | Ho et al. | 345/145 |

*Primary Examiner*—Xiao Wu
*Attorney, Agent, or Firm*—Oblon, Spivak, McClelland, Maier & Neustadt, P.C.

[57] ABSTRACT

A video monitor adjustment system of the invention comprises an image display means, a cursor display means, a function selector and an adjustment value calculator. The image display means outputs video information for displaying a crosshatch pattern on a video monitor and the function selector allows the choice of desired adjustable items depending on in which area of the crosshatch pattern the cursor is located. The adjustment value calculator calculates a value to be set for each adjustable item selected in accordance with the amount of movement of a mouse and outputs the calculated value to the video monitor.

9 Claims, 14 Drawing Sheets

FIG. 6 BASIC ADJUSTMENT FUNCTIONS

| | ADJUSTMENT ITEM | SET VALUE INCREMENTED (+) | SET VALUE DECREMENTED (−) |
|---|---|---|---|
| a | HORIZONTAL POSITION | SHIFTS PICTURE RIGHTWARD | SHIFTS PICTURE LEFTWARD |
| b | VERTICAL POSITION | SHIFTS PICTURE UPWARD | SHIFTS PICTURE DOWNWARD |
| c | HORIZONTAL SIZE | INCREASES WIDTH | DECREASES WIDTH |
| d | VERTICAL SIZE | INCREASES HEIGHT | DECREASES HEIGHT |
| e | SIDE PINCUSHION DISTORTION | ADJUSTS PICTURE TO APPROACH BARREL SHAPE | ADJUSTS PICTURE TO APPROACH PINCUSHION SHAPE |
| f | SIDE PINCUSHION BALANCE | PUSHES RIGHT SIDE OUTWARD AND PULLS LEFT SIDE INWARD | PUSHES LEFT SIDE OUTWARD AND PULLS RIGHT SIDE INWARD |
| g | TRAPEZOIDAL DISTORTION | INCREASES BOTTOM SIDE RELATIVE TO TOP SIDE | INCREASES TOP SIDE RELATIVE TO BOTTOM SIDE |
| h | PARALLELOGRAM DISTORTION | SHIFTS TOP SIDE RIGHTWARD AND BOTTOM SIDE LEFTWARD | SHIFTS TOP SIDE LEFTWARD AND BOTTOM SIDE RIGHTWARD |
| i | TILT | ROTATES PICTURE CLOCKWISE | ROTATES PICTURE COUNTERCLOCKWISE |
| j | CORNER DISTORTION (TOP) | PUSHES UPPER-LEFT AND UPPER-RIGHT CORNERS HORIZONTALLY OUTWARD | PULLS UPPER-LEFT AND UPPER-RIGHT CORNERS HORIZONTALLY INWARD |
| k | CORNER DISTORTION BALANCE (TOP) | MOVES UPPER-LEFT AND UPPER-RIGHT CORNERS RIGHTWARD | MOVES UPPER-LEFT AND UPPER-RIGHT CORNERS LEFTWARD |
| l | CORNER DISTORTION (BOTTOM) | PUSHES LOWER-LEFT AND LOWER-RIGHT CORNERS HORIZONTALLY OUTWARD | PULLS LOWER-LEFT AND LOWER-RIGHT CORNERS HORIZONTALLY INWARD |
| m | CORNER DISTORTION BALANCE (BOTTOM) | MOVES LOWER-LEFT AND LOWER-RIGHT CORNERS RIGHTWARD | MOVES LOWER-LEFT AND LOWER-RIGHT CORNERS LEFTWARD |

| n | ARBITRARY POSITION ADJUSTMENT | a+ | SHIFTS PICTURE RIGHTWARD | a− | SHIFTS PICTURE LEFTWARD |
|---|---|---|---|---|---|
| b+ | SHIFTS PICTURE UPWARD | n1 | SHIFTS PICTURE IN UPPER-RIGHT DIRECTION | n3 | SHIFTS PICTURE IN UPPER-LEFT DIRECTION |
| b− | SHIFTS PICTURE DOWNWARD | n2 | SHIFTS PICTURE IN LOWER-RIGHT DIRECTION | n4 | SHIFTS PICTURE IN LOWER-LEFT DIRECTION |
| o | UNIDIRECTIONAL H-SIZE ADJUSTMENT | a+ | SHIFTS PICTURE RIGHTWARD | a− | SHIFTS PICTURE LEFTWARD |
| c+ | INCREASES WIDTH | o1 | INCREASES WIDTH RIGHTWARD WITH LEFT SIDE FIXED | o3 | INCREASES WIDTH LEFTWARD WITH RIGHT SIDE FIXED |
| c− | DECREASES WIDTH | o2 | DECREASES WIDTH RIGHTWARD WITH RIGHT SIDE FIXED | o4 | DECREASES WIDTH LEFTWARD WITH LEFT SIDE FIXED |
| p | UNIDIRECTIONAL V-SIZE ADJUSTMENT | b+ | SHIFTS PICTURE UPWARD | b− | SHIFTS PICTURE DOWNWARD |
| d+ | INCREASES HEIGHT | p1 | INCREASES HEIGHT UPWARD WITH BOTTOM SIDE FIXED | p3 | INCREASES HEIGHT DOWNWARD WITH TOP SIDE FIXED |
| d− | DECREASES HEIGHT | p2 | DECREASES HEIGHT UPWARD WITH TOP SIDE FIXED | p4 | DECREASES HEIGHT DOWNWARD WITH BOTTOM SIDE FIXED |
| q | DIAGONAL SIZE ADJUSTMENT | o1 | INCREASES WIDTH RIGHTWARD WITH LEFT SIDE FIXED | o2 | DECREASES WIDTH RIGHTWARD WITH RIGHT SIDE FIXED | o3 | INCREASES WIDTH LEFTWARD WITH RIGHT SIDE FIXED | o4 | DECREASES WIDTH LEFTWARD WITH LEFT SIDE FIXED |
| p1 | INCREASES HEIGHT UPWARD WITH BOTTOM SIDE FIXED | q1 | EXPANDS PICTURE IN UPPER-RIGHT DIRECTION WITH LOWER-LEFT CORNER FIXED | q5 | MOVES UPPER-LEFT CORNER IN UPPER-RIGHT DIRECTION WITH LOWER-RIGHT CORNER FIXED | q9 | EXPANDS PICTURE IN UPPER-LEFT DIRECTION WITH LOWER-RIGHT CORNER FIXED | q13 | MOVES UPPER-RIGHT CORNER IN UPPER-LEFT DIRECTION WITH LOWER-LEFT CORNER FIXED |
| p2 | DECREASES HEIGHT UPWARD WITH TOP SIDE FIXED | q2 | MOVES LOWER-RIGHT CORNER IN UPPER-RIGHT DIRECTION WITH UPPER-LEFT CORNER FIXED | q6 | SHRINKS PICTURE IN UPPER-RIGHT DIRECTION WITH UPPER-RIGHT CORNER FIXED | q10 | MOVES LOWER-LEFT CORNER IN UPPER-LEFT DIRECTION WITH UPPER-RIGHT CORNER FIXED | q14 | SHRINKS PICTURE IN UPPER-LEFT DIRECTION WITH UPPER-LEFT CORNER FIXED |

*FIG. 7A* COMBINED ADJUSTMENT FUNCTIONS

| | | | |
|---|---|---|---|
| p3 INCREASES HEIGHT DOWNWARD WITH TOP SIDE FIXED | q3 EXPANDS PICTURE IN LOWER-RIGHT DIRECTION WITH UPPER-LEFT CORNER FIXED | q7 MOVES LOWER-LEFT CORNER IN LOWER-RIGHT DIRECTION WITH UPPER-RIGHT CORNER FIXED | q11 EXPANDS PICTURE IN LOWER-LEFT DIRECTION WITH UPPER-RIGHT CORNER FIXED | q15 MOVES LOWER-RIGHT CORNER IN LOWER-LEFT DIRECTION WITH UPPER-LEFT CORNER FIXED |
| p4 DECREASES HEIGHT DOWNWARD WITH BOTTOM SIDE FIXED | q4 MOVES UPPER-RIGHT CORNER IN LOWER-RIGHT DIRECTION WITH LOWER-LEFT CORNER FIXED | q8 SHRINKS PICTURE IN LOWER-RIGHT DIRECTION WITH LOWER-RIGHT CORNER FIXED | q12 MOVES UPPER-LEFT CORNER IN LOWER-LEFT DIRECTION WITH LOWER-RIGHT CORNER FIXED | q16 SHRINKS PICTURE IN LOWER-LEFT DIRECTION WITH LOWER-LEFT CORNER FIXED |
| r LEFT/RIGHT SIDE PINCUSHION BALANCE CORRECTION | e+ ADJUSTS PICTURE TO APPROACH BARREL SHAPE | | e− ADJUSTS PICTURE TO APPROACH PINCUSHION SHAPE | |
| f+ PUSHES RIGHT SIDE OUTWARD AND PULLS LEFT SIDE INWARD | r1 PUSHES RIGHT SIDE OUTWARD | | r3 PULLS LEFT SIDE INWARD | |
| f− PUSHES LEFT SIDE OUTWARD AND PULLS RIGHT SIDE INWARD | r2 PUSHES LEFT SIDE OUTWARD | | r4 PULLS RIGHT SIDE INWARD | |
| s LEFT/RIGHT SIDE TILT CORRECTION | g+ INCREASES BOTTOM SIDE RELATIVE TO TOP SIDE | | g− INCREASES TOP SIDE RELATIVE TO BOTTOM SIDE | |
| h+ SHIFTS TOP SIDE RIGHTWARD AND BOTTOM SIDE LEFTWARD | s1 ROTATES LEFT SIDE CLOCKWISE | | s3 ROTATES RIGHT SIDE CLOCKWISE | |
| h− SHIFTS TOP SIDE LEFTWARD AND BOTTOM SIDE RIGHTWARD | s2 ROTATES RIGHT SIDE COUNTERCLOCKWISE | | s4 ROTATES LEFT SIDE COUNTERCLOCKWISE | |
| t UPPER-LEFT/RIGHT CORNER DISTORTION CORRECTION | j+ PUSHES UPPER-LEFT AND UPPER-RIGHT CORNERS HORIZONTALLY OUTWARD | | j− PULLS UPPER-LEFT AND UPPER-RIGHT CORNERS HORIZONTALLY INWARD | |
| k+ MOVES UPPER-LEFT AND UPPER-RIGHT CORNERS RIGHTWARD | t1 PUSHES UPPER-RIGHT CORNER HORIZONTALLY OUTWARD | | t3 PULLS UPPER-LEFT CORNER HORIZONTALLY INWARD | |

*FIG. 7B* COMBINED ADJUSTMENT FUNCTIONS

| | | | |
|---|---|---|---|
| k− | MOVES UPPER-LEFT AND UPPER-RIGHT CORNERS LEFTWARD | t2 | PUSHES UPPER-LEFT CORNER HORIZONTALLY OUTWARD | t4 | PULLS UPPER-RIGHT CORNER HORIZONTALLY INWARD |
| u | LOWER LEFT/RIGHT CORNER DISTORTION CORRECTION | l+ | PUSHES LOWER-LEFT AND LOWER-RIGHT CORNERS HORIZONTALLY OUTWARD | l− | PULLS LOWER-LEFT AND LOWER-RIGHT CORNERS HORIZONTALLY INWARD |
| m+ | MOVES LOWER-LEFT AND LOWER-RIGHT CORNERS RIGHTWARD | u1 | PUSHES LOWER-RIGHT CORNER HORIZONTALLY OUTWARD | u3 | PULLS LOWER-LEFT CORNER HORIZONTALLY INWARD |
| m− | MOVES LOWER-LEFT AND LOWER-RIGHT CORNERS LEFTWARD | u2 | PUSHES LOWER-LEFT CORNER HORIZONTALLY OUTWARD | u4 | PULLS LOWER-RIGHT CORNER HORIZONTALLY INWARD |

*FIG. 7C* COMBINED ADJUSTMENT FUNCTIONS

FIG. 8 a): HORIZONTAL POSITION g): TRAPEZOIDAL DISTORTION b): VERTICAL POSITION h): PARALLELOGRAM DISTORTION c): HORIZONTAL SIZE i): TILT d): VERTICAL SIZE j): CORNER DISTORTION (TOP)

e): SIDE PINCUSHION DISTORTION k): CORNER DISTORTION BALANCE (TOP)

f): SIDE PINCUSHION BALANCE l): CORNER DISTORTION (BOTTOM)

m): CORNER DISTORTION BALANCE (BOTTOM)

F I G . 9 n): ARBITRARY POSITION ADJUSTMENT (a+b)

r): LEFT/ RIGHT SIDE PINCUSHION BALANCE CORRECTION (e+f)

o): UNIDIRECTIONAL H-SIZE ADJUSTMENT (a+c)

s): LEFT/ RIGHT SIDE TILT CORRECTION (g+h)

p): UNIDIRECTIONAL V-SIZE ADJUSTMENT (b+d)

t): UPPER-LEFT/ RIGHT CORNER DISTORTION CORRECTION (j+k)

q): DIAGONAL SIZE ADJUSTMENT (o+p)

u): LOWER-LEFT/ RIGHT CORNER DISTORTION CORRECTION (l+m)

FIG. 10

| Area | Cursor Moving Direction | | | | | | | |
|---|---|---|---|---|---|---|---|---|
| | Upward | Downward | Rightward | Leftward | Upper-right | Lower-right | Upper-left | Lower-left |
| A1 | p1 | p4 | o2 | o3 | q5 | q8 | q9 | q12 |
| A2 | p1 | p4 | Note 1 | Note 1 | p1, Note 2 | p4, Note 2 | p1, Note 2 | p4, Note 2 |
| A3 | p1 | p4 | o1 | o4 | q1 | q4 | q13 | q16 |
| A4 | Note 1 | Note 1 | o2 | o3 | o2, Note 2 | o2, Note 2 | o3, Note 2 | o3, Note 2 |
| A5 | b+ | b- | a+ | a- | n1 | n2 | n3 | n4 |
| A6 | Note 1 | Note 1 | o1 | o4 | o1, Note 2 | o1, Note 2 | o4, Note 2 | o4, Note 2 |
| A7 | p2 | p3 | o2 | o3 | q6 | q7 | q10 | q11 |
| A8 | p2 | p3 | Note 1 | Note 1 | p2, Note 2 | p3, Note 2 | p2, Note 2 | p3, Note 2 |
| A9 | p2 | p3 | o1 | o4 | q2 | q3 | q14 | q15 |

Note 1) No adjustment item is selected when the cursor is moved in the stated direction.
Note 2) Only the horizontal or vertical component of the amount of cursor movement is effective for the selection of adjustment items.

FIG. 11

| AREA | CURSOR ON VERT. LINE UPWARD | CURSOR ON VERT. LINE DOWNWARD | CURSOR ON VERT. LINE RIGHTWARD | CURSOR ON VERT. LINE LEFTWARD | CURSOR ON HOR. LINE UPWARD | CURSOR ON HOR. LINE DOWNWARD | CURSOR ON HOR. LINE RIGHTWARD | CURSOR ON HOR. LINE LEFTWARD |
|---|---|---|---|---|---|---|---|---|
| A10 | NOTE 3 | NOTE 3 | t3 | t2 | i+ | i- | t3 | t2 |
| A11 | NOTE 3 | NOTE 3 | k+ | k- | NOTE 3 | NOTE 3 | k+ | k- |
| A12 | NOTE 3 | NOTE 3 | t1 | t4 | i- | i+ | t1 | t4 |
| A13 | NOTE 3 | NOTE 3 | s1 | s4 | NOTE 3 | NOTE 3 | s1 | s4 |
| A14 | NOTE 3 | NOTE 3 | h+ | h- | NOTE 3 | NOTE 3 | h+ | h- |
| A15 | NOTE 3 | NOTE 3 | s3 | s2 | NOTE 3 | NOTE 3 | s3 | s2 |
| A16 | NOTE 3 | NOTE 3 | r3 | r2 | NOTE 3 | NOTE 3 | r3 | r2 |
| A17 | NOTE 3 | NOTE 3 | f+ | f- | NOTE 3 | NOTE 3 | f+ | f- |
| A18 | NOTE 3 | NOTE 3 | r1 | r4 | NOTE 3 | NOTE 3 | r1 | r4 |
| A19 | NOTE 3 | NOTE 3 | s4 | s1 | NOTE 3 | NOTE 3 | s4 | s1 |
| A20 | NOTE 3 | NOTE 3 | h- | h+ | i+ | i- | h- | h+ |
| A21 | NOTE 3 | NOTE 3 | s2 | s3 | NOTE 3 | NOTE 3 | s2 | s3 |
| A22 | NOTE 3 | NOTE 3 | u3 | u2 | NOTE 3 | NOTE 3 | u3 | u2 |
| A23 | NOTE 3 | NOTE 3 | m+ | m- | NOTE 3 | NOTE 3 | m+ | m- |
| A24 | NOTE 3 | NOTE 3 | u1 | u4 | i- | i+ | u1 | u4 |

NOTE 3) OPERATIONS ASSIGNED TO AREAS A1 TO A9 ARE ACTIVATED

VIDEO MONITOR ADJUSTMENT SYSTEM

BACKGROUND OF THE INVENTION AND RELATED ART STATEMENT

The present invention relates to a video monitor adjustment system which enables smooth and efficient adjustment of a video monitor having microcomputer-assisted display screen adjustable functions.

Conventionally known video monitors include a microcomputer-assisted display screen adjustable function as disclosed in Japanese Unexamined Patent Publication No. 3-35287, for example.

In such conventional systems, a microcomputer makes it possible to select adjustable items of a video monitor by the use of an operating switch, for example, and set a deflection circuit, a video amplifier and other circuits of the video monitor to appropriate adjustment values so that its display screen characteristics can be adjusted in an arbitrary way. More particularly, an operator selects a desired adjustable item by manipulating an operating switch or other controls and turns a potentiometer, for instance, to adjust selected item while carefully watching an on-screen picture in order to determine an optimum value to be set for the adjustable item. Adjustable items include horizontal position, horizontal size, vertical position, vertical size, side pincushion distortion, trapezoidal distortion, parallelogram distortion, tilt, and so on with respect to the geometry of the on-screen picture as well as brightness, contrast, convergence, and so on with respect to the quality of the on-screen picture.

The operator must select a single adjustable item at a time by means of an operating switch or other controls and determine a value to be set for each selected adjustable item by using a potentiometer, for instance, in the aforementioned arrangement of the prior art. Since the operator has to go through such complicated adjustment procedures, it is essential that the operator be sufficiently skilled in adjustment work. Video monitor adjustment involves more than a few adjustable items which affect each other, such as horizontal position and horizontal size, and vertical position and vertical size, wherein if the setting of one adjustable item is altered, the setting of another interrelated adjustable item should also be altered correspondingly. With the arrangement of the prior art, however, it has absolutely been impossible so far to simultaneously adjust settings of a plurality of mutually related adjustable items. Another problem of the prior art arrangement has been that it used to require a complicated construction and high production costs because it has been essential to provide dedicated operating switches, potentiometers, and so on for adjustment work.

SUMMARY OF THE INVENTION

This invention overcomes the aforementioned problems of prior art technology. Accordingly, it is an object of the invention to provide a video monitor adjustment system which enables the choice of a combined adjustable function (in which settings of a plurality of mutually related adjustable items can be adjusted simultaneously) by utilizing a cursor display feature of a microcomputer, whereby adjustment procedures are remarkably simplified and can be carried out easily and efficiently even by an unskilled operator, and no dedicated operating switches or potentiometers for adjustment work are required at all.

To accomplish this object, a video monitor adjustment system comprises an image display means storing video information for displaying a crosshatch pattern on a video monitor; a cursor display means for displaying a cursor image on the crosshatch pattern displayed on a video monitor based on the video information stored in said image display means; a function selector for selecting one of a plurality of adjustable functions depending on a location of the cursor image in the crosshatch pattern and said plurality of adjustable function including a combined function which is a combination of two or more of other adjustable functions; and an adjustment value calculator for calculating an adjustment value for each adjustable function selected by said function selector in accordance with the amount of movement of a mouse and transmitting the calculated adjustment value to said video monitor.

In the video monitor adjustment system thus constructed, the function selector enables an operator to choose either a single adjustable item or the combined adjustable function by moving the cursor to a desired area of the crosshatch pattern. In the combined adjustable function, two or more interrelated adjustable items are selected in combination depending on in which area of the crosshatch pattern the cursor is located, and can be adjusted simultaneously. As the adjustment value calculator calculates values to be set for the individual adjustable items selected by the function selector in accordance with the amount of movement of the mouse and outputs them to the video monitor, the operator can establish optimum settings for two or more interrelated adjustable items at the same time by moving the cursor.

In a preferred form of the invention, the operator moves the cursor on the crosshatch pattern by simply moving the mouse when selecting a desired adjustable item, and moves the mouse while pressing a mouse button when determining a value to be set for the adjustable item selected. As the value to be set for the current adjustable item is incremented or decremented in accordance with the movement of the mouse, that value is output to the video monitor on a real-time basis. Accordingly, the position, size, shape, orientation or other properties of the on-screen crosshatch pattern varies in accordance with the movement of the mouse. Since the cursor is geometrically fixed to the crosshatch pattern, rather than to the screen of the video monitor, the cursor moves together with the crosshatch pattern when the latter is repositioned, resized, reshaped, or otherwise changed. This gives a visual effect similar to what is commonly seen in dragging operation used in computer graphics software programs. Ina varied form of the invention, other types of pointing devices, such as a joystick, a trackball, a light pen, cursor control keys of a keyboard, or arrow keys on a game control pad may substitute for the mouse to perform its functions described above.

Preferably, the function selector selects different adjustable items depending on whether the cursor overlies any of vertical lines and horizontal lines of the crosshatch pattern in each area of the crosshatch pattern. According to this arrangement, it is possible to devise an easy-to-operate adjustment system as the function selector offers the choice of a number of desired combinations of adjustable items even if the crosshatch pattern is not divided into so many areas.

Also, the function selector may select different adjustable items depending on whether the cursor overlies a vertical line or a horizontal line of the crosshatch pattern. In this arrangement, the function selector offers the choice of a larger number of desired combinations of adjustable items and it becomes yet easier to understand operations and functions of such adjustable items as screen size and position. Preferably, the vertical lines of the crosshatch pattern are related to horizontal size and horizontal position adjustment and the horizontal lines to vertical size and vertical position adjustment for example. This allows the operator to easily recognize a relationship between the on-screen location of the cursor and the function of each adjustable item.

Also in a preferred arrangement, the function selector selects different adjustable items depending on the direction in which the mouse is moved. In this arrangement, the moving direction of the mouse can be related to the direction of adjustment to further facilitate system operation.

Preferably, the cursor display means presents the cursor in different shapes corresponding to each adjustable item selected by the function selector. This allows the operator to recognize the contents of the individual adjustable items. Furthermore, the cursor display means may periodically change the current cursor shape to provide even easier recognition of the contents of the adjustable items. The shapes of the cursor may be defined in such a way that the operator can intuitively recognize how the on-screen picture is varied by altering the setting for the currently selected adjustable item.

It would be understood from the foregoing summary of the invention that the operator can find and establish optimum settings for the individual adjustable items by moving the cursor while watching the crosshatch pattern displayed on the video monitor. Accordingly, adjustment procedures are remarkably simplified and can be carried out easily and efficiently even by an unskilled operator, without requiring any dedicated operating switches or other controls for adjustment work.

These and other objects, features and advantages of the invention will become more apparent upon reading the following detailed description in conjunction with the accompanying drawings.

BRIEF DESCRIPTION OF THE DRAWINGS

FIG. 13 shows how each basic adjustable item is selected in a varied form of the preferred embodiment.

DETAILED DESCRIPTION OF THE PREFERRED EMBODIMENT OF THE INVENTION

A preferred embodiment of the invention is now described with reference to the accompanying drawings.

Figure 1:
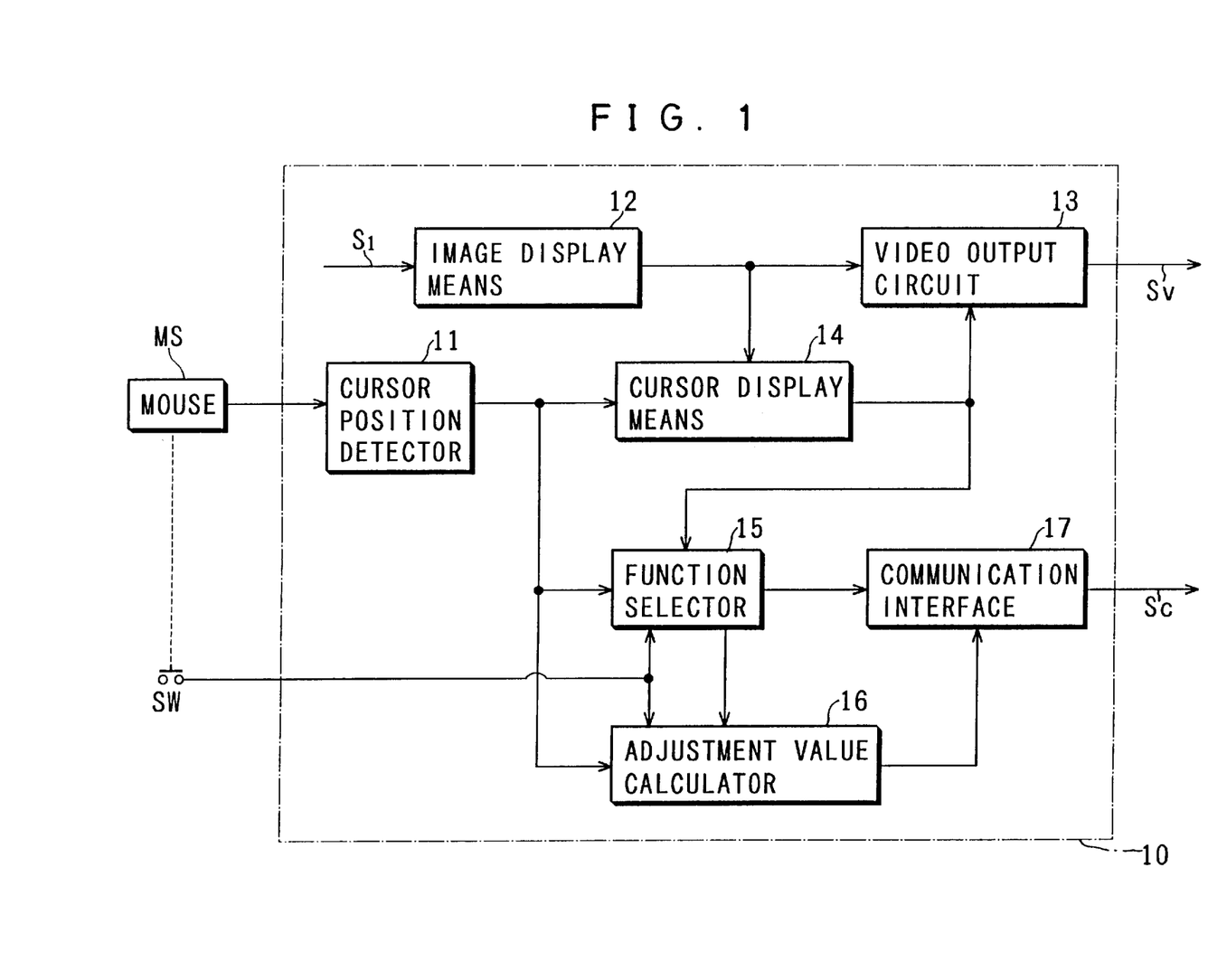
FIG. 1 is a general block diagram of a video monitor adjustment system according to one preferred embodiment of the invention.
Figure 2:
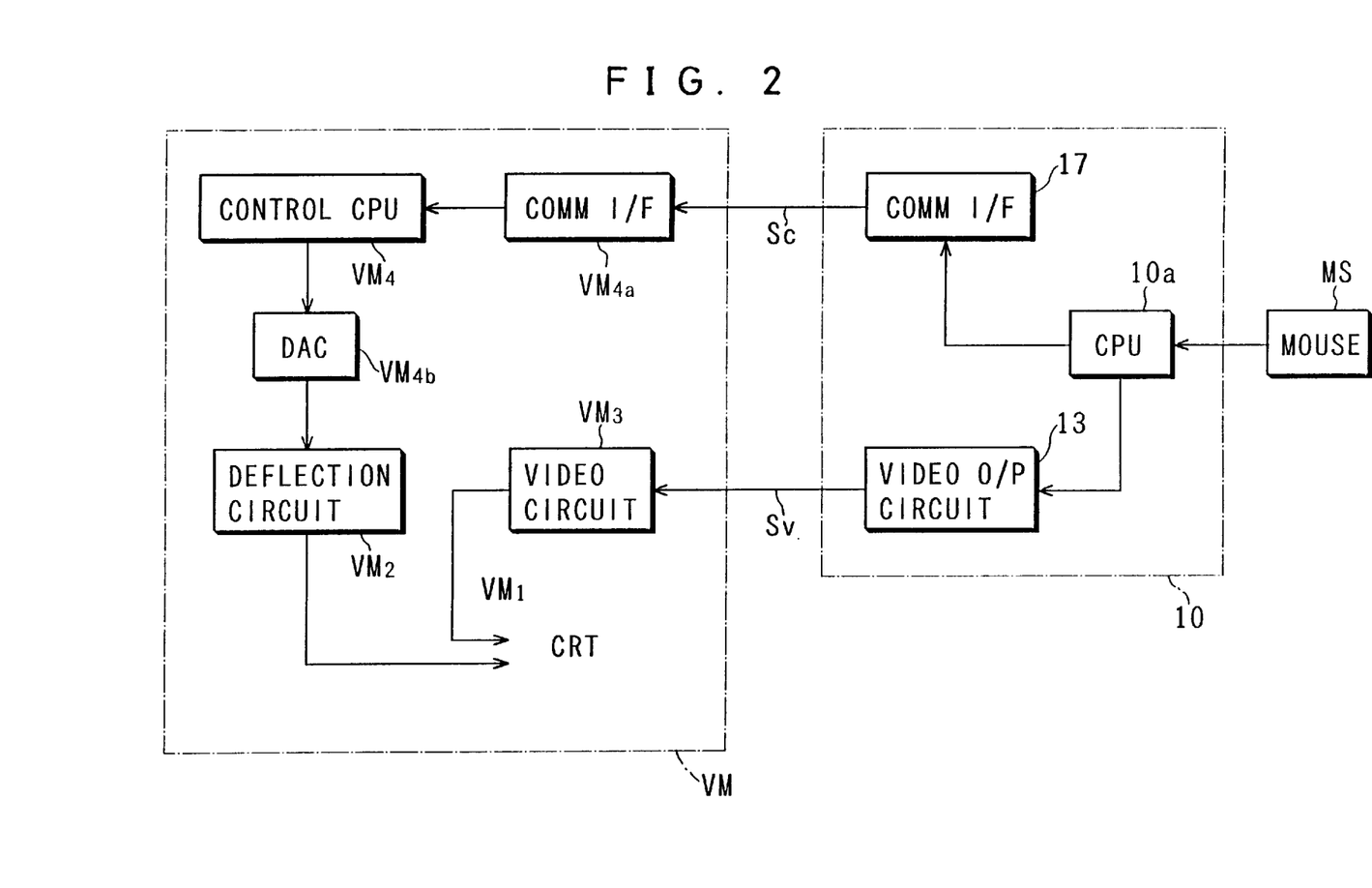
FIG. 2 is a simplified block diagram showing how the video monitor adjustment system is connected to a video monitor when used for adjustment.

Referring to FIG. 1, a video monitor adjustment system 10 according to the preferred embodiment comprises as its principal elements an image display means 12, a function selector 15 and an adjustment value calculator 16 for adjusting a picture displayed on a video monitor VM which is shown in FIG. 2. It is to be noted that the adjustment system 10 provides adjustable functions concerning the geometry of the picture displayed on the video monitor VM.

The video monitor VM includes a cathode ray tube (CRT) VM1 for displaying images, a deflection circuit VM2 for driving the CRT VM1 and a video circuit VM3, as well as a microcomputer VM4 for executing system control. A control signal Sc output from the adjustment system 10 is entered to the microcomputer VM4 via a communication interface VM4$a$, while an output of the microcomputer VM4 is delivered to the deflection circuit VM2 by way of a multichannel-type digital-to-analog (D/A) converter VM4$b$. In addition, a video signal Sv is entered from the adjustment system 10 to the video circuit VM3.

With this construction, the video monitor VM can present any image on the screen of the CRT VM1 in accordance with the video signal Sv. The microcomputer VM4 can adjust the position, size, distortion, and so on of the picture displayed on the CRT VM1 in an arbitrary way by outputting specific values of adjustment parameters to relevant parts of the deflection circuit VM2 via the D/A converter VM4$b$, wherein the individual values of those adjustment parameters are set in accordance with the control signal Sc fed from the adjustment system 10.

The adjustment system 10 contains a microcomputer 10$a$ and is associated with a mouse MS incorporating a mouse switch SW which is operated by a mouse button.

An output of the mouse MS is entered to the microcomputer 10$a$ of the adjustment system 10 and led to a cursor position detector 11. An output of the cursor position detector 11 branches out and is fed to a cursor display means 14 as well as to the function selector 15 and the adjustment value calculator 16 while the mouse switch SW is connected to the function selector 15 and the adjustment value calculator 16. Entered to the image display means 12 is an adjustment start signal S1 which is generated through an unillustrated keyboard or other input device connected to the microcomputer 10$a$, and an output of the image display means 12 is delivered to the video monitor VM as the video signal Sv by way of a video output circuit 13. The output of the image display means 12 branches out and is entered to the cursor display means 14 as well, and an output of the cursor display means 14 branches out and is entered to the video output circuit 13 and the function selector 15.

One each output of the function selector 15 and the adjustment value calculator 16 is delivered to the video monitor VM as the control signal Sc by way of a communication interface 17. Another output of the function selector 15 is led to the adjustment value calculator 16. It is to be pointed out that the individual circuit elements of the adjustment system 10 are configured by means of software within the microcomputer 10$a$ with the exception of the video output circuit 13 and the communication interface 17.

Figure 3:
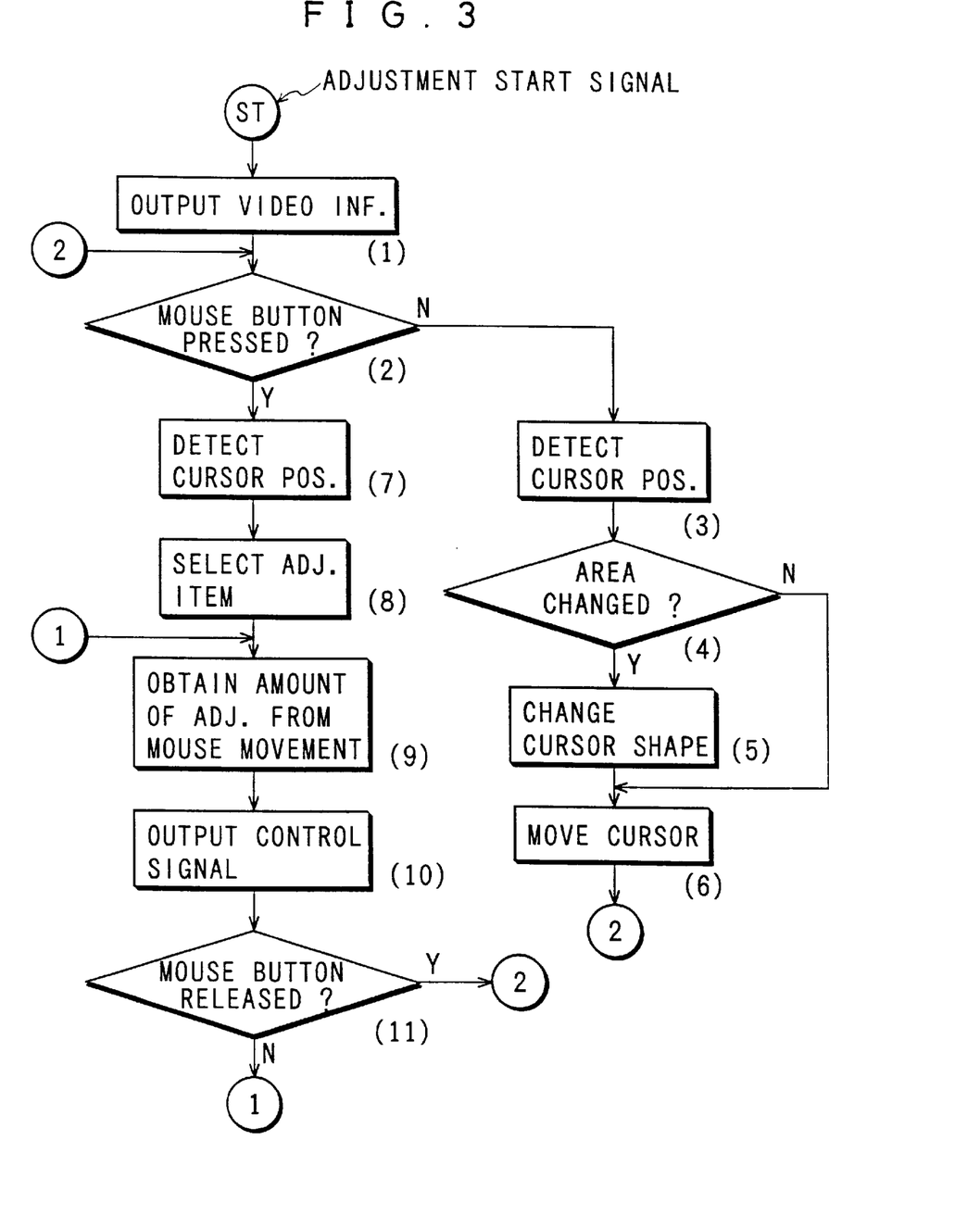
FIG. 3 is a flowchart showing a video monitor adjustment procedure.

The adjustment system 10 thus constructed operates in accordance with a program sequence flowchart shown in FIG. 3. This program sequence begins by generating the adjustment start signal S1 when an operator enters a command via an unillustrated keyboard, for example.

Figure 4A:
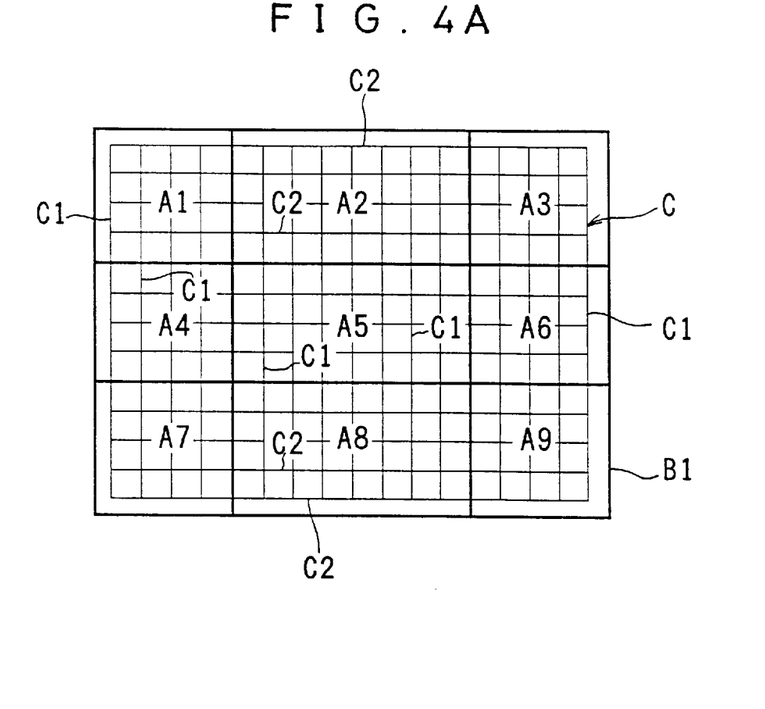
FIGS. 4A and 4B are diagrams showing how a crosshatch pattern is segmented as it is displayed on the video monitor.
Figure 4B:
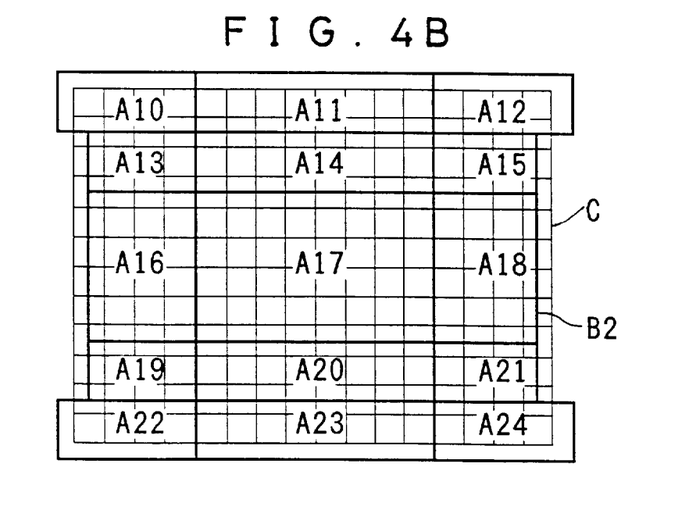

First, the microcomputer 10a outputs video information which is used for displaying a crosshatch pattern C for adjustment purposes in step 1 of the program sequence of FIG. 3. This video information is delivered as the video signal Sv to the video monitor VM via the video output circuit 13, causing the video monitor VM to present the crosshatch pattern C on the screen of the CRT VM1 as shown in FIG. 4A. The crosshatch pattern C thus presented is configured with a number of intersecting vertical lines C1 and horizontal lines C2. The whole crosshatch pattern C is divided into a plurality of areas A1 to A9 arranged in horizontal rows and vertical columns by an imaginary segmentation frame B1. In addition, the crosshatch pattern C has another segmentation frame B2 dividing the crosshatch pattern C into another set of multiple areas A10 to A24 as shown in FIG. 4B, in which none of border lines or dividing lines of the segmentation frame B2 coincide with the vertical lines C1 or the horizontal lines C2 of the crosshatch pattern C.

If the operator moves the mouse MS without pushing the mouse button, the microcomputer 10a recognizes that the mouse button is not pressed (step 2), and the cursor position detector 11 detects the position of a cursor set by the mouse MS (step 3). Then, the on-screen cursor is moved to a current position (step 6) after changing the shape of the cursor (step 5) depending on in which area of the segmentation frame B1 the cursor is located (step 4).

Figure 5A:
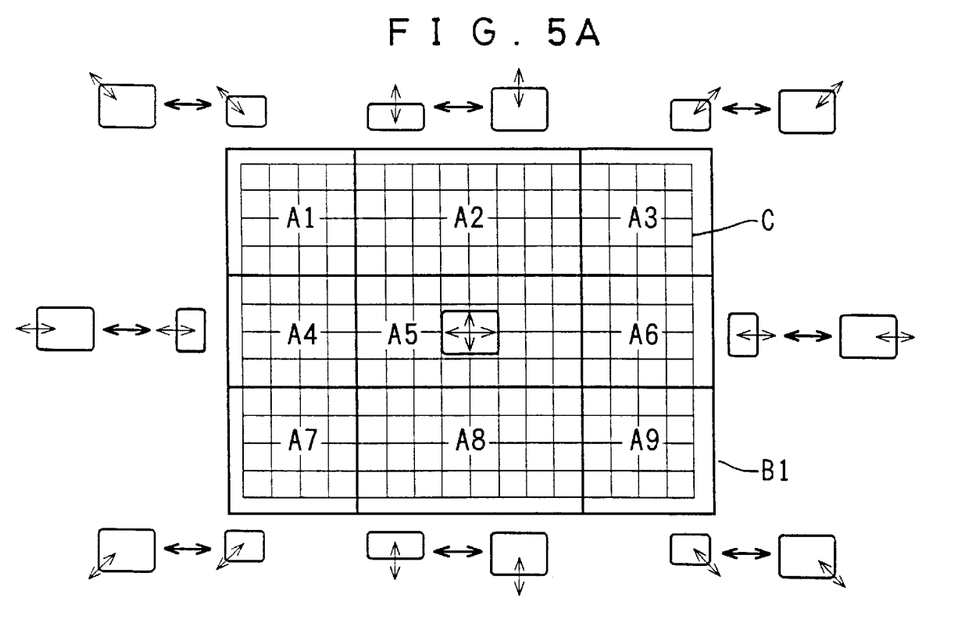
FIGS. 5A and 5B are diagrams showing various cursor shapes selectively displayed on the video monitor.

For example, when the cursor is located in the area A1 of the segmentation frame B1, the cursor assumes a relatively wide rectangular shape as depicted outside the segmentation frame B1 near its upper-left corner in FIG. 5A. In this cursor shape, a thick, horizontal line with bi-directional large arrows indicates that the cursor shape continuously varies between its maximum size shown on the left side and minimum size shown on the right side in a periodic manner. Smaller bi-directional arrow marks at upper-left corners of symbols of the maximum and minimum sizes indicates that the upper-left corner of the rectangular cursor moves in an oblique direction shown by each of the smaller arrow marks, or that the left and top sides move simultaneously in horizontal and vertical directions, respectively, when the cursor size varies periodically as mentioned above. Similarly, when the cursor is located in the area A6, the cursor shrinks and expands horizontally as only the right side of the cursor moves to the left and right periodically as depicted to the right of the area A6 in FIG. 5A. The cursor assumes different shapes and periodically varies in dimensions in the other areas of the segmentation frame B1 as well, as shown for the respective areas in FIG. 5A, except in the area A5 where the cursor is maintained in fixed shape and size as illustrated without making any periodic variations.

Figure 5B:
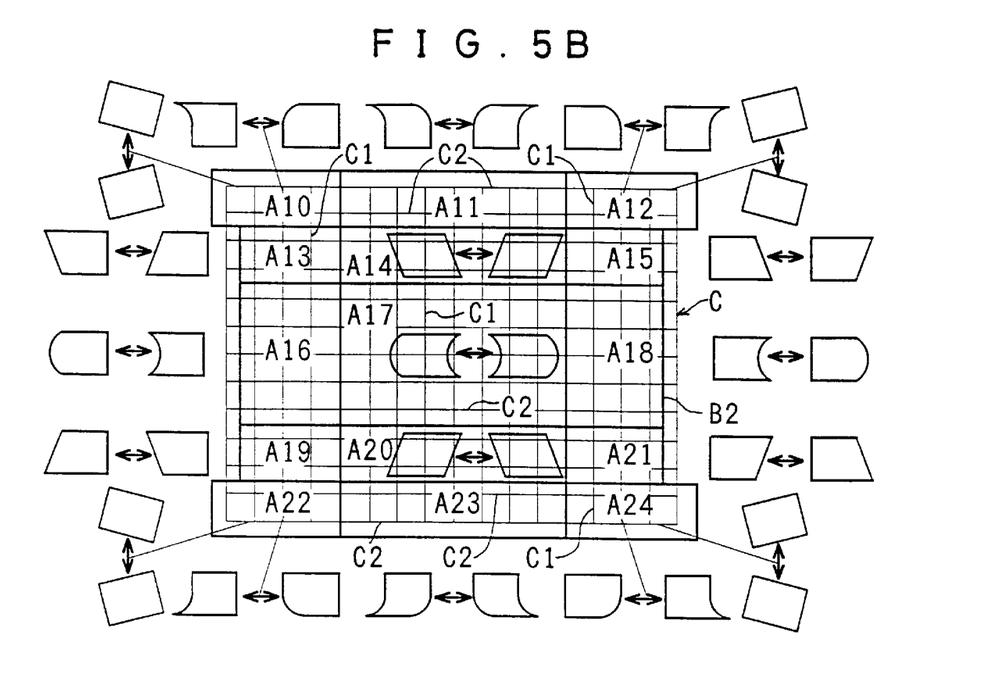

When the cursor lies on any of vertical and horizontal lines defining borders of the areas A10 to A24, the cursor assumes one of shapes which vary periodically as shown in FIG. 5B. It is to be noted in this connection that the cursor shape differs as illustrated depending on whether it lies on any of the vertical lines C1 or the horizontal lines C2 when the cursor is located in the area A10, A12, A22 or A24. In one example, when the cursor lies on any of the vertical lines C1 or the horizontal lines C2 in the area A17, the cursor takes shapes shown in the middle of the area A17 in FIG. 5B and, more particularly, the cursor shape continuously varies between the two shapes shown on the left and right sides of the horizontal bi-directional arrow mark in the area A17 in a periodic manner. In another example, the cursor shape continuously varies between those shapes which are shown above and below the vertical bi-directional arrow mark near the upper-left corner of FIG. 5B when the cursor lies on any of the horizontal lines C2 in the area A10, while the cursor shape continuously varies between those shapes which are shown to the left and right of the horizontal bi-directional arrow mark near the upper-left corner of FIG. 5B when the cursor lies on any of the vertical lines C1 in the area A10.

In summary, steps 2 to 6 of the program sequence of FIG. 3 causes the cursor to be shown in many different shapes on the video monitor VM as illustrated in FIGS. 5A and 5B when the operator slides the mouse MS without pressing the mouse button to move the cursor on the crosshatch pattern C depending on in which area (A1 to A9) the cursor is located, whether the cursor lies on any of the vertical and horizontal lines that defines the borders of the areas A10 to A24, and whether the cursor lies on any of the vertical lines C1 or the horizontal lines C2 in the area A10, A12, A22 or A24. The cursor shape thus determined, except the cursor in the area A5, varies continuously between two shapes shown on the both sides of the relevant horizontal or vertical bi-directional arrow mark in a periodic manner.

If the operator slides the mouse MS while holding the mouse button down, the microcomputer 10a recognizes that the mouse button is pressed (step 2), the cursor position detector 11 detects the position of the cursor (step 7), and an adjustable item of the video monitor VM is selected (step 8). In step 8, basic adjustable items a to m shown in FIG. 6 and combined adjustable items n to u shown in FIG. 7 are available for the operator's choice, in which each of the combined adjustable items is a combination of two or more basic adjustable items.

Figure 6:
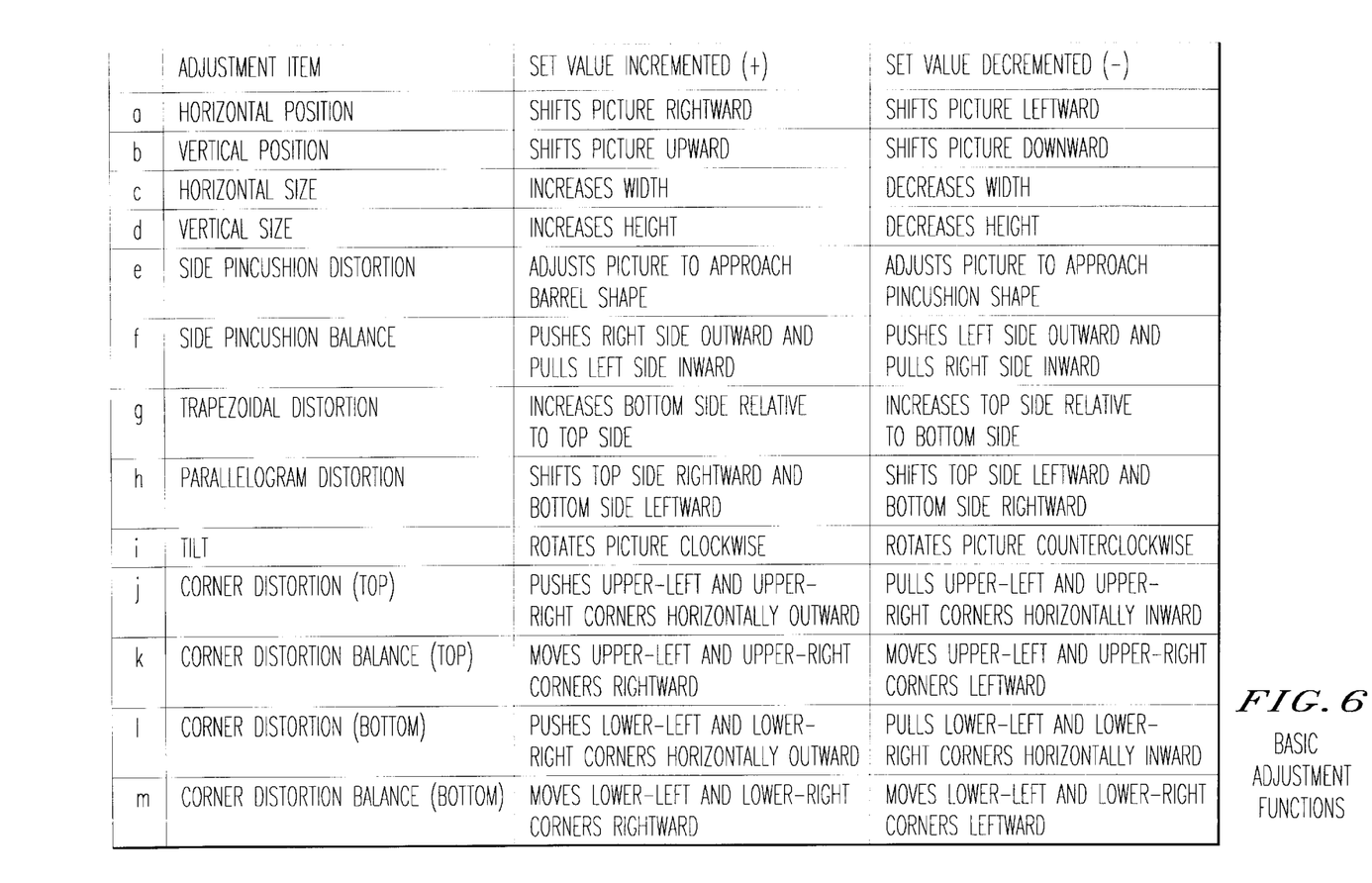
FIG. 6 is a listing of basic adjustable items and their functional description.
Figure 7C:
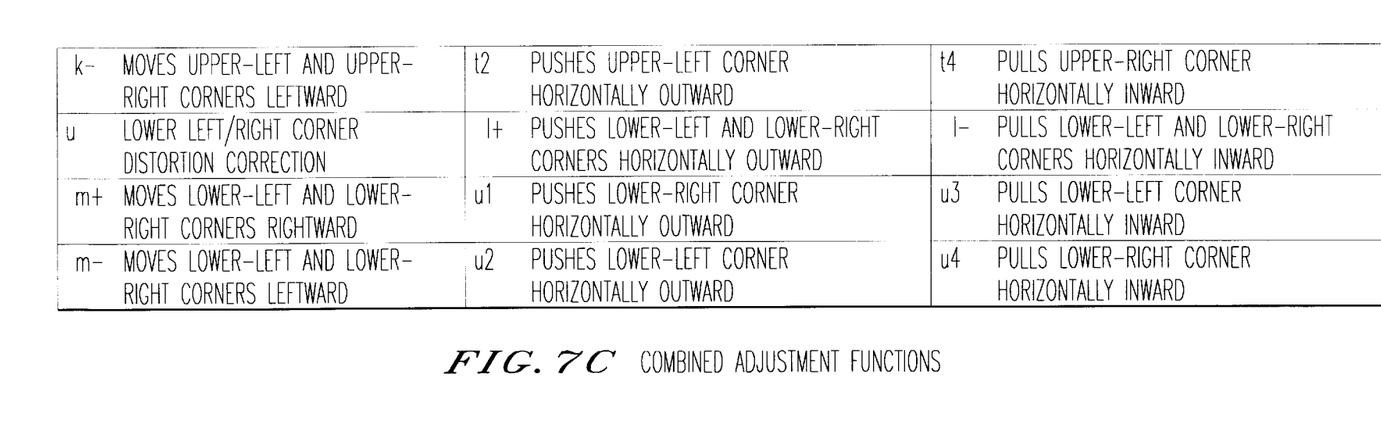
FIG. 7 is a listing of combined adjustable items and their functional description.

For example, arbitrary position adjustment (n) in FIG. 7 is a combination of horizontal position adjustment (a) and vertical position adjustment (b) in FIG. 6. It is shown in FIG. 7 that arbitrary position adjustment (n) allows the operator to simultaneously shift the on-screen picture rightward and upward by increasing a setting of horizontal position adjustment (a+) and that of vertical position adjustment (b+) so that the on-screen picture is moved obliquely in an upper-right direction as a whole (n1). Similarly, arbitrary position adjustment (n) allows the operator to simultaneously shift the on-screen picture leftward and upward by decreasing the setting of horizontal position adjustment (a−) and increasing that of vertical position adjustment (b+) so that the on-screen picture is moved obliquely in an upper-left direction as a whole (n3).

Likewise, unidirectional horizontal size adjustment (o) in FIG. 7 is a combination of horizontal position adjustment (a) and horizontal size adjustment (c) in FIG. 6, while unidirectional vertical size adjustment (p) in FIG. 7 is a combination of vertical position adjustment (b) and vertical size adjustment (d) in FIG. 6. Also, diagonal size adjustment (q) in FIG. 7 is a combination of unidirectional horizontal size adjustment (o) and unidirectional vertical size adjustment (p) in FIG. 7, and is therefore a combination of horizontal position adjustment (a), horizontal size adjustment (c), vertical position adjustment (b) and vertical size adjustment (d) in FIG. 6.

Figure 8:
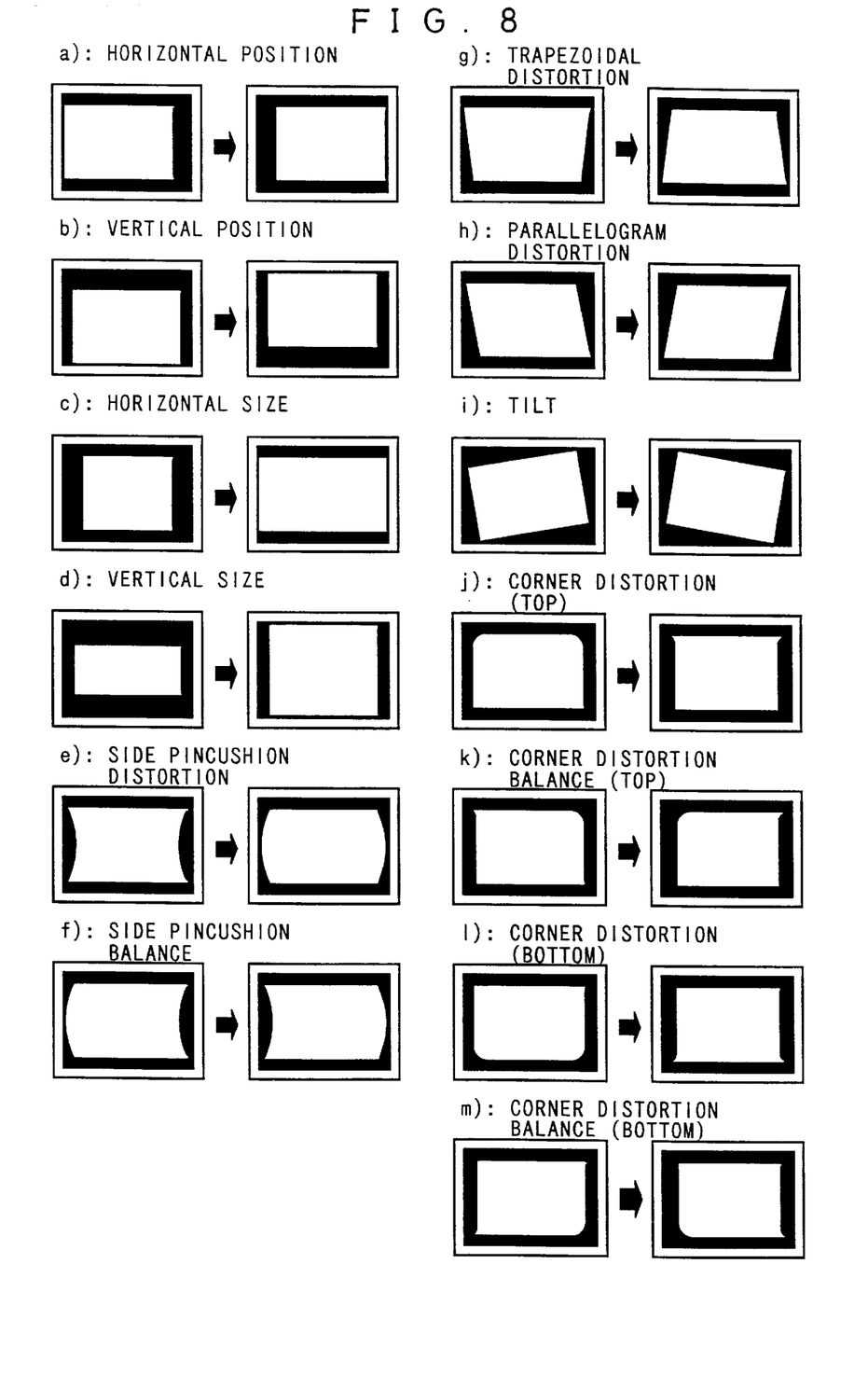
FIG. 8 is a pictorial functional representation of the individual basic adjustable items.
Figure 9:
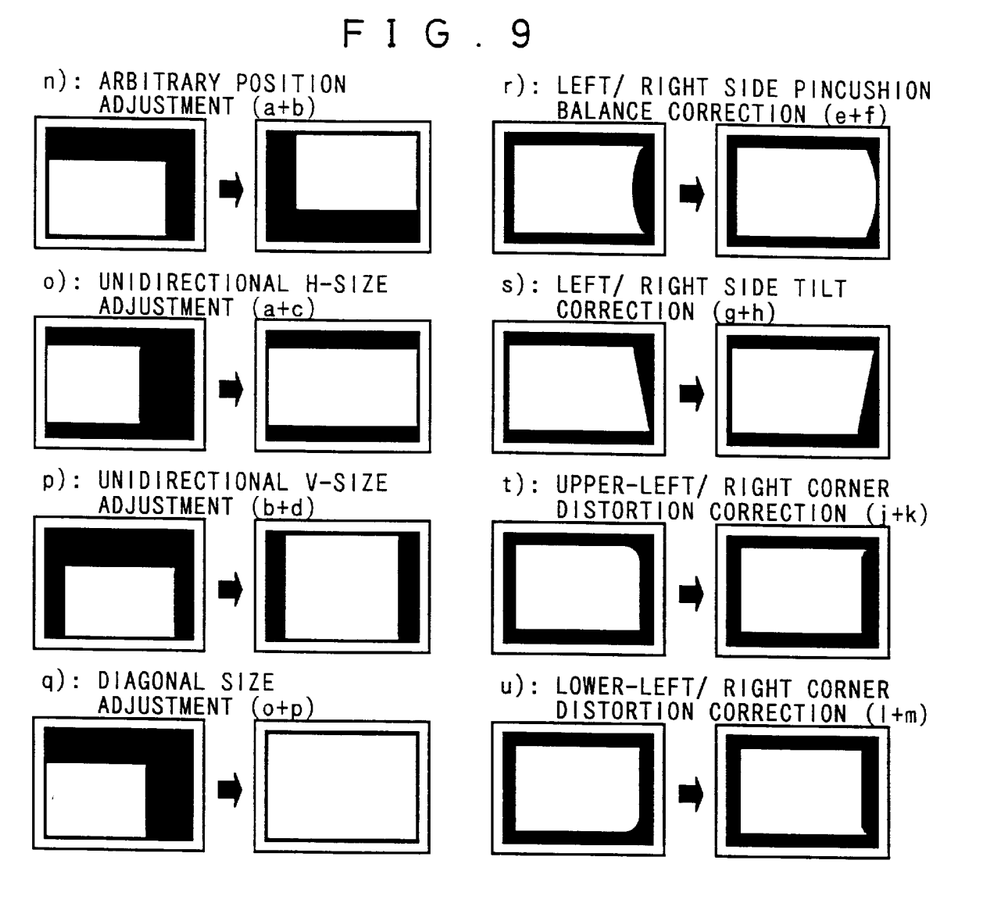
FIG. 9 is a pictorial functional representation of the combined adjustable items.

When settings of the aforementioned adjustable items in FIGS. 6 and 7 are increased, the on-screen picture displayed on the video monitor VM changes from left ones to right ones as illustrated for the individual adjustable items in FIGS. 8 and 9. Referring to these Figures, unidirectional horizontal size adjustment (o) depicted in FIG. 9, for example, is a combination of horizontal position adjustment (a) and horizontal size adjustment (c) depicted in FIG. 8. In unidirectional horizontal size adjustment (o), it is possible to increase the horizontal size of the on-screen picture rightward while keeping its left side at a fixed position by simultaneously increasing the settings (a+, c+) of horizontal position adjustment (a) and horizontal size adjustment (c) as shown in FIG. 9.

Figure 10:
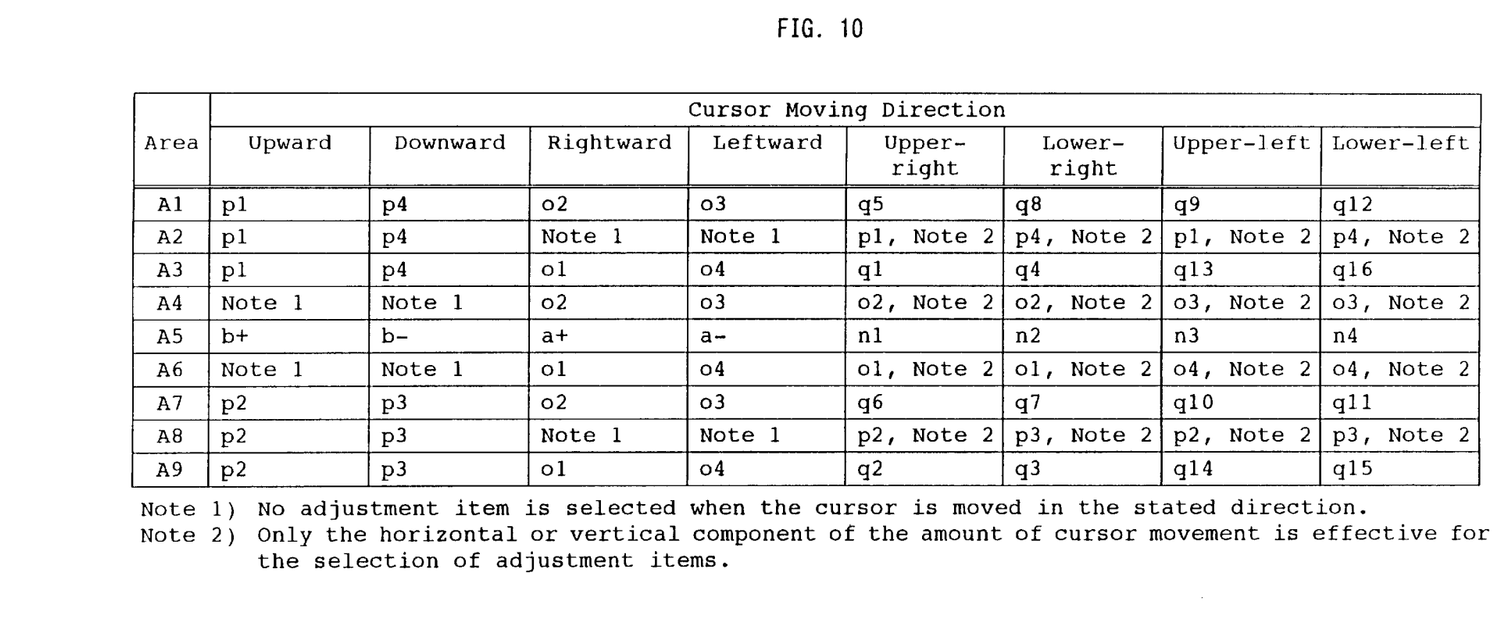
FIG. 10 shows how a first group of adjustable items are selected.
Figure 11:
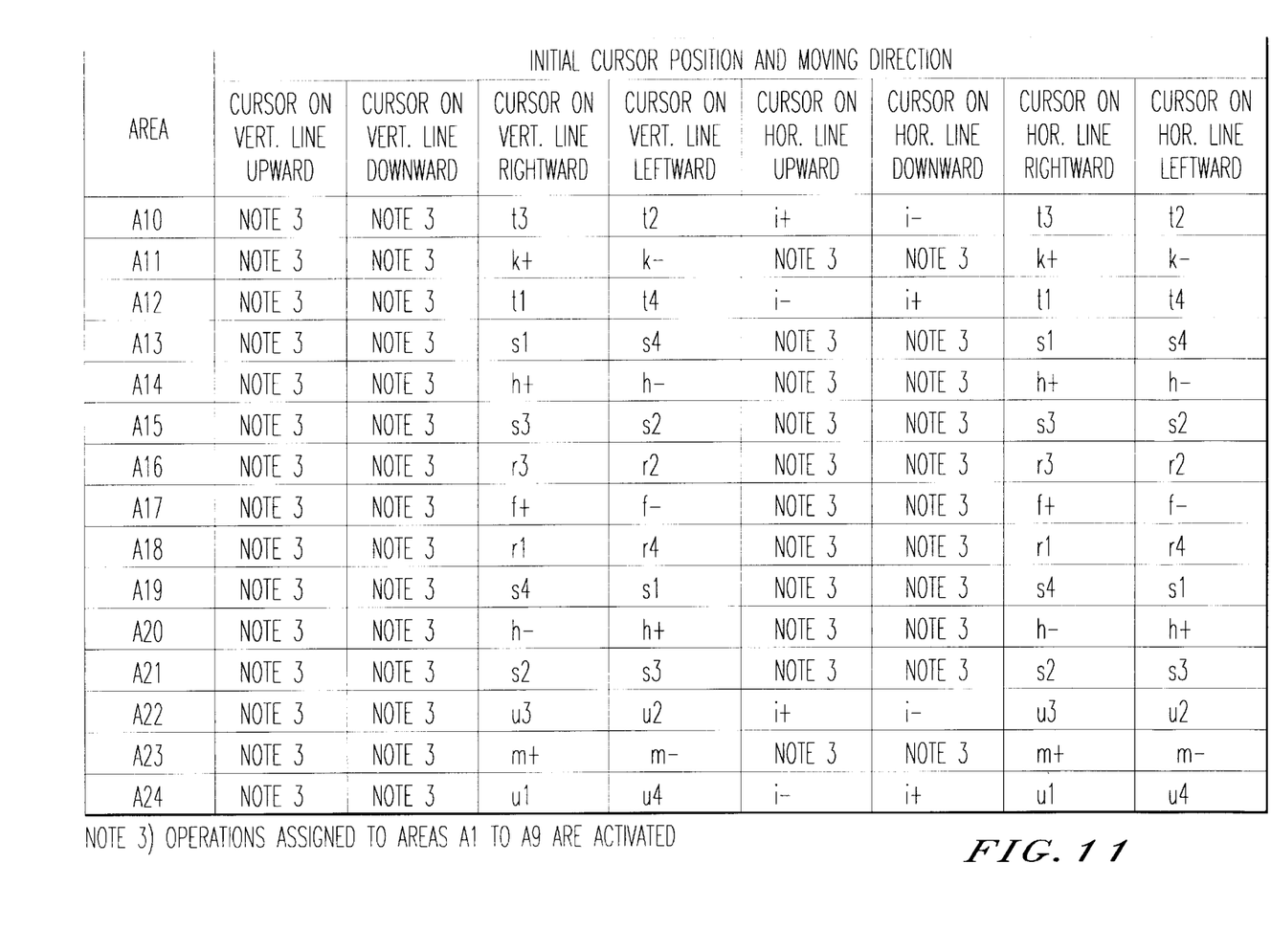
FIG. 11 shows how a second group of adjustable items are selected.

The program sequence of FIG. 3 enables the operator in its step 8 to select a desired adjustable item depending on in which area (A1 to A24) the cursor is located, and the moving direction of the mouse MS as shown in FIGS. 10 and 11. The adjustment value calculator 16 calculates a value to be set for the adjustable item in accordance with the amount of movement of the mouse MS in step 9 of the program sequence, and information on the selected adjustable item and its calculated setting is output to the video monitor VM as the control signal Sc in step 10. Steps 9 and 10 are cyclically executed until the mouse button is released in step 11.

Figure 12:
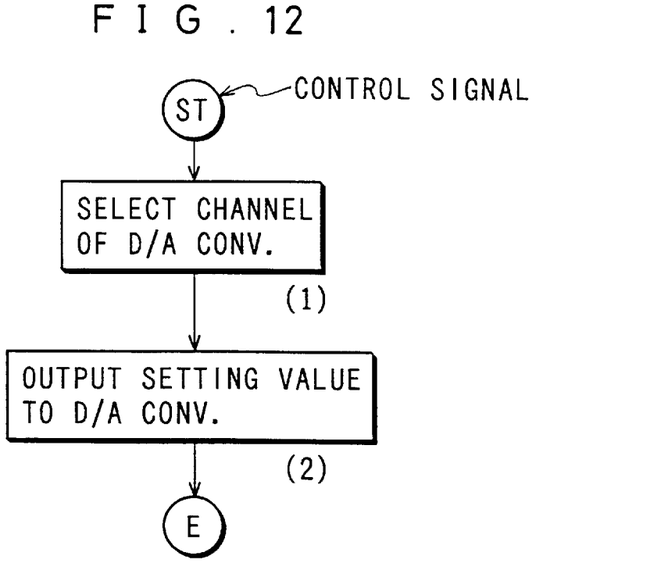
FIG. 12 is a flowchart showing how the video monitor is adjusted.

When the control signal Sc is received from the adjustment system 10 as described above, the microcomputer VM4 of the video monitor VM selects a channel of the D/A converter VM4b corresponding to the operator-selected adjustable item in step 1 of FIG. 12. Then, as a particular value for the selected adjustable item is determined by the operator, that value is set to a specific part of the deflection circuit VM2 in step 2 of FIG. 12, whereby the crosshatch pattern C displayed on the CRT VM1 is reshaped, enabling the operator to accomplish necessary adjustment work. This means that the operator can easily determine an optimum setting for each adjustable item by holding the mouse button down and moving the mouse MS while observing how the position, size, shape, orientation or other properties of the on-screen crosshatch pattern C varies.

FIGS. 10 and 11 indicate in tabular form how the operator can select each adjustable item in step 8 of FIG. 3.

As an example, the third row of a table shown in FIG. 10 indicates that it is possible to select different adjustable items in accordance with the moving direction of the mouse MS if the operator moves the mouse MS while holding the mouse button down when the cursor is located in the area A1. More particularly, if the operator moves the mouse MS upward while holding the mouse button down when the cursor is located in the area A1, unidirectional vertical size adjustment (p) shown in FIG. 7 is selected, and the height of the on-screen picture is increased with its bottom side fixed in accordance with the amount of movement of the mouse MS (p1) as shown in the second column of the third row in FIG. 10. If the operator moves the mouse MS in an upper-left direction in the same condition, diagonal size adjustment (q) shown in FIG. 7 is selected, and the on-screen picture can be expanded in the upper-left direction with its lower-right corner fixed (q9) as shown in the eighth column of the third row in FIG. 10.

Referring to the fourth row of the table shown in FIG. 10, although the operator can select unidirectional vertical size adjustment (p) by moving the mouse MS upward or downward while holding the mouse button down when the cursor is located in the area A2 (as shown in the second and third columns of the fourth row in FIG. 10), it is impossible to select any adjustable item even when the mouse MS is moved leftward or rightward in the same condition (Note 3 in the fourth and fifth columns of the fourth row in FIG. 10). Although it is possible to select unidirectional vertical size adjustment (p) if the operator moves the mouse MS in an oblique direction in the same condition (as shown in the sixth to ninth columns of the fourth row in FIG. 10), the amount of change in the shape of the on-screen picture is determined by only a vertical component of the amount of movement of the mouse MS (Note 2 in FIG. 10).

Referring now to the seventh row of the table shown in FIG. 10, the operator can select vertical position adjustment (b) in FIG. 6 by moving the mouse MS upward or downward while holding the mouse button down when the cursor is located in the area A5 (as shown in the second and third columns of the seventh row in FIG. 10), and horizontal position adjustment (a) in FIG. 6 by moving the mouse MS leftward or rightward in the same condition (as shown in the fourth and fifth columns of the seventh row in FIG. 10). Further, it is possible select arbitrary position adjustment (n) of FIG. 7 by moving the mouse MS in an oblique direction in the same condition (as shown in the sixth to ninth columns of the seventh row in FIG. 10).

FIG. 11 shows adjustable items selectable by moving the mouse MS upward, downward, leftward or rightward while holding the mouse button down when the cursor overlies any of the vertical lines C1 or the horizontal lines C2 in one of the areas A10 to A24. It is to be pointed out in this connection that operations selectable in the areas A10 to A24 are deactivated, and those assigned to the areas A1 to A9 are activated, in some conditions even when the cursor overlies a vertical line C1 or a horizontal line C2 in one of the areas A10 to A24, as stated in Note 3 in FIG. 11.

The individual adjustable items which are selected as described above are uniquely related to corresponding shapes of the cursor and the specific areas A1 to A24 of the crosshatch pattern C (FIGS. 5A–5B). Specifically, steps 4 and 5 of the program sequence of FIG. 3 alters the cursor shape depending on in which area (A1 to A24) the cursor is located so that the cursor is displayed in a shape corresponding to the adjustable item selected in step 8. This arrangement relieves the operator of the need to remember exact procedures for selecting the adjustable items shown in FIGS. 10 and 11. Instead, the operator can find and select a desired adjustable item by moving around the cursor on the crosshatch pattern C in the manner of guesswork while watching the cursor shape which varies according to the location (areas A1 to A24) of the cursor.

If the adjustable item selected in the above-described manner is one of the combined adjustable items shown in FIG. 7, the combined adjustable item selected is separated into two or more basic adjustable items. Then, a value to be set for each of those basic adjustable items is calculated in accordance with the amount of movement of the mouse MS in step 9 of the program sequence and output to the video monitor VM as the control signal Sc in step 10. On receiving the control signal Sc, the microcomputer VM4 of the video monitor VM automatically selects channels of the D/A converter VM4b that correspond to the relevant basic adjustable items, whereby individual settings are output to the deflection circuit VM2 via the respective channels as shown in FIG. 12.

Referring again to FIGS. 1 and 3, step 1 of the program sequence of FIG. 3 relates to the image display means 12 of FIG. 1, while steps 3 and 7 relate to the cursor position detector 11 of FIG. 1. Also, steps 4 to 6 of the program sequence of FIG. 3 relate to the cursor display means 14 of FIG. 1. The output of the image display means 12 is entered to the cursor display means 14 as depicted in FIG. 1 for establishing the areas A1 to A9 within the segmentation frame B1 and the areas A10 to A24 within the segmentation frame B2, while the output of the cursor display means 14 is entered to the video output circuit 13, together with the output of the image display means 12, for superimposing the cursor on the crosshatch pattern C displayed on the video monitor VM.

Step 8 of the program sequence of FIG. 3 relates to the function selector 15 of FIG. 1, while steps 9 and 10 relate to the adjustment value calculator 16 of FIG. 1. The reason why the output of the cursor display means 14 branches out and is entered to the function selector 15 is that information concerning the cursor location, i.e., the area (A1 to A24) in which the cursor is located, should be transmitted to the function selector 15 to enable the selection of appropriate adjustable items corresponding to the current cursor location.

In the foregoing preferred embodiment, the basic adjustable items shown in FIG. 6 and the combined adjustable items shown in FIG. 7 are selected in accordance with the current cursor location (areas A1 to A24 within the crosshatch pattern C) and the movement of the cursor. In a varied form of the embodiment, numeric keys [0] to [9] of a keyboard, or the numeric keys [0] to [9] and cursor control keys [←], [→], [↑] and [↓], may additionally be used for directly specifying most often selected basic adjustable items and combined adjustable items as shown in a table of FIG. 13.

Referring to the second column of the third row of the table shown in FIG. 13, for example, the operator can directly select arbitrary position adjustment (n) in FIG. 7 by pressing the numeric key [1], and then move the on-screen picture in a lower-left direction (n4) by holding the key [1] down by a distance corresponding to the duration of time that the key is pressed. Referring also to the fifth column of the third row of the table shown in FIG. 13, the operator can directly select horizontal position adjustment (a) of FIG. 6 by pressing the numeric key [4] or the left-arrow key [←], and then move the on-screen picture leftward (a–) by holding the key down by a distance corresponding to the duration of time that the key is pressed. The fourth and fifth rows of the table shown in FIG. 13 indicate that other adjustable items can also be directly selected by pressing a numeric key or a cursor control key together with a shift key or an ALT key of the keyboard.

It would be recognized from the foregoing description that the procedures for selecting the adjustable items shown in FIGS. 10 and 11 are related to the areas A1 to A24 within the crosshatch pattern C shown in FIG. 5 while the procedures for selecting the adjustable items shown in FIG. 13 are related to the arrangement of the numeric keys or the cursor control keys on the keyboard to enable the operator to easily and intuitively understand contents of the individual adjustable items. It is to be pointed out that such relationships between operating procedures and adjustable items to be selected may be altered as appropriate in accordance with specific contents and types of the adjustable items.

The adjustment system 10 shown in FIG. 1 may be built in the microcomputer VM4 of the video monitor VM instead of employing the configuration shown in FIG. 2 in which a major portion of the adjustment system 10 is incorporated in the microcomputer 10a. In this alternative configuration, the communication interface 17 and the communication interface VM4a shown in FIG. 2 may be removed and the video output circuit 13 may be directly connected to the microcomputer VM4.

What is claimed is:

1. A video monitor adjustment system comprising:

an image display means storing video information for displaying a crosshatch pattern on a video monitor;

a cursor display means for displaying a cursor image on the crosshatch pattern displayed on a video monitor based on the video information stored in said image display means;

a function selector for selecting one of a plurality of adjustable functions depending on a location of the cursor image in the crosshatch pattern, said plurality of adjustable functions including a combined function which is a combination of two or more other adjustable functions; and an adjustment value calculator for calculating an adjustment value for each adjustable function selected by said function selector in accordance with the amount of movement of a pointing device and transmitting the calculated adjustment value to said video monitor.

2. A video monitor adjustment system as defined in claim 1, wherein said function selector selects one of different adjustable functions depending on whether the cursor lies on any of vertical lines and horizontal lines of the crosshatch pattern in each area of the crosshatch pattern.

3. A video monitor adjustment system as defined in claim 2, wherein said function selector selects one of different adjustable functions depending on whether the cursor lies on a vertical line or a horizontal line of the crosshatch pattern.

4. A video monitor adjustment system as defined in claim 1, 2 or 3, wherein said function selector selects one of different adjustable functions depending on the movement direction of the pointing device.

5. A video monitor adjustment system as defined in claim 1, 2 or 3, wherein said cursor display means displays the cursor in different shapes corresponding to each adjustable function item selected by said function selector.

6. A video monitor adjustment system as defined in claim 4, wherein said cursor display means displays the cursor in different shapes corresponding to each adjustable function selected by said function selector.

7. A video monitor adjustment system as defined in claim 5, wherein said cursor display means periodically changes the current cursor shape.

8. A video monitor adjustment system as defined in claim 5, wherein said cursor display means periodically changes the cursor image between two images representing extreme conditions for the actual change which would take Lace on the video monitor when an instruction is given by operation of the pointing device.

9. A video monitor adjustment system as defined in claim 1, wherein said plurality of adjustable functions include a vertical position, a horizontal position, a vertical size, a horizontal size, a bi-directional size and a bi-directional position adjustments of the video monitor.

* * * * *